US012709137B2

(12) United States Patent
Shoji et al.

(10) Patent No.: US 12,709,137 B2
(45) Date of Patent: Aug. 18, 2026

(54) WINDOW GLASS APPARATUS FOR VEHICLE

(71) Applicant: AGC Inc., Tokyo (JP)

(72) Inventors: Hideaki Shoji, Tokyo (JP); Shoichi Takeuchi, Tokyo (JP); Toshiki Sayama, Tokyo (JP); Yusuke Kato, Tokyo (JP); Satoshi Kaneko, Tokyo (JP)

(73) Assignee: AGC INC., Tokyo (JP)

( * ) Notice: Subject to any disclaimer, the term of this patent is extended or adjusted under 35 U.S.C. 154(b) by 309 days.

(21) Appl. No.: 18/429,411

(22) Filed: Jan. 31, 2024

(65) Prior Publication Data

US 2024/0166029 A1 May 23, 2024

Related U.S. Application Data

(63) Continuation of application No. PCT/JP2022/029110, filed on Jul. 28, 2022.

(30) Foreign Application Priority Data

Aug. 2, 2021 (JP) ................................ 2021-126708

(51) Int. Cl.
*B60J 1/20* (2006.01)
*H01Q 1/32* (2006.01)

(52) U.S. Cl.
CPC .............. *B60J 1/20* (2013.01); *H01Q 1/3208* (2013.01)

(58) Field of Classification Search
CPC ....... B60J 1/02; B60J 1/18; B60J 1/20; H01Q 1/1271; H01Q 1/3208

(Continued)

(56) References Cited

U.S. PATENT DOCUMENTS 8,586,894 B2 * 11/2013 Igura ........................ H05B 3/84 219/202
9,018,564 B2 * 4/2015 Sargent .................. H01R 12/57 219/203

(Continued)

FOREIGN PATENT DOCUMENTS

JP 2003-170739 A 6/2003
JP 2005-109601 A 4/2005

(Continued)

OTHER PUBLICATIONS

English translation of WO 2016/185898; retrieved via Patent Translate located at www.epo.org. (Year: 2026).*

(Continued)

*Primary Examiner* — Jason S Daniels
(74) *Attorney, Agent, or Firm* — Foley & Lardner LLP

(57) ABSTRACT

A window glass apparatus for a vehicle including a first bus bar provided in or on the glass plate and including an upper portion extending in a direction along an upper edge of the glass plate; a second bus bar provided in or on the glass plate and including a lower portion extending in a direction along a lower edge of the glass plate; and an antenna disposed in a space near the upper portion and configured to transmit and receive a radio wave having a certain frequency; wherein the glass plate has a heating area extending between the upper portion and the lower portion, and a non-heating area extending above the upper portion; wherein the heating area is an area where a conductive member is disposed, the conductive member being configured to flow a direct current in an up-down direction.

19 Claims, 9 Drawing Sheets

(58) Field of Classification Search
USPC .......................................................... 296/84.1
See application file for complete search history.

(56) References Cited

U.S. PATENT DOCUMENTS

| | | | |
|---|---|---|---|
| 10,347,964 B2 | 7/2019 | Droste et al. | |
| 11,515,614 B2 * | 11/2022 | Dai | H01Q 13/10 |
| 2016/0134013 A1 | 5/2016 | Suenaga et al. | |

FOREIGN PATENT DOCUMENTS

| | | |
|---|---|---|
| JP | 2017-210071 A | 11/2017 |
| JP | 2020-161975 A | 10/2020 |
| WO | WO-2012/079040 A1 | 6/2012 |
| WO | WO-2016/096432 A1 | 6/2016 |
| WO | WO-2016/185898 A1 | 11/2016 |

OTHER PUBLICATIONS

English translation of JP 2003-170739; retrieved via Patent Translate located at www.epo.org. (Year: 2026).*

International Searching Authority, "International Search Report," issued in connection with International Patent Application No. PCT/JP2022/029110, dated Oct. 11, 2022.

International Searching Authority, "Written Opinion," issued in connection with International Patent Application No. PCT/JP2022/029110, dated Oct. 11, 2022.

* cited by examiner

WINDOW GLASS APPARATUS FOR VEHICLE

This application is a continuation of PCT Application No. PCT/JP2022/029110, filed on Jul. 28, 2022, which is based upon and claims the benefit of priority from Japanese Patent Application No. 2021-126708 filed on Aug. 2, 2021. The contents of those applications are incorporated herein by reference in their entireties.

TECHNICAL FIELD

The present disclosure relates to a window glass apparatus for a vehicle.

BACKGROUND ART

There is known a window glass apparatus for a vehicle, which includes a conductive member that heats a glass plate by applying a voltage across a pair of bus bars for defogging and deicing, and an antenna disposed near a heating area where the conductive member is disposed (see, for example, Patent Documents 1, 2, and 3).

PRIOR ART DOCUMENTS

Patent Documents

Patent Document 1: WO 2016/185898
Patent Document 2: WO 2016/096432
Patent Document 3: JP-A-2017-210071

DISCLOSURE OF INVENTION

Technical Problem

Nevertheless, in the window glass having the heating area where the conductive member for defogging or the like is disposed, an area for disposing the antenna in the window glass is reduced depending on the size or the like of the heating area, and accordingly, it is difficult to ensure a sufficient antenna gain in a certain frequency band.

The present disclosure is to provide a window glass apparatus for a vehicle that allows a heating area to be compatible with an antenna sufficiently ensuring an antenna gain in a certain frequency band.

Solution to Problem

The present disclosure provides a window glass apparatus for a vehicle including:

- a glass plate for a vehicle,
- a first bus bar provided in or on the glass plate and having an upper portion extending in a direction along an upper edge of the glass plate,
- a second bus bar provided in or on the glass plate and having a lower portion extending in a direction along a lower edge of the glass plate, and
- an antenna disposed in a space near the upper portion and configured to transmit and receive a radio wave in a certain frequency,
- wherein the glass plate has a heating area extending between the upper portion and the lower portion, and a non-heating area extending above the upper portion,
- wherein the heating area is an area where the conductive member is disposed, the conductive member being configured to flow a direct current in an up-down direction by applying the direct voltage between the first bus bar and the second bus bar by the power supply such that the heating area is heated by heat generation of the conductive member, and
- wherein the antenna has a conductor spaced apart from the glass plate and opposed to the glass plate.

Advantageous Effects of Invention

According to the present disclosure, it is possible to provide a window glass apparatus for a vehicle that allows the heating area to be compatible with an antenna ensuring a sufficient antenna gain in a certain frequency band.

DESCRIPTION OF EMBODIMENTS

Figure 1:
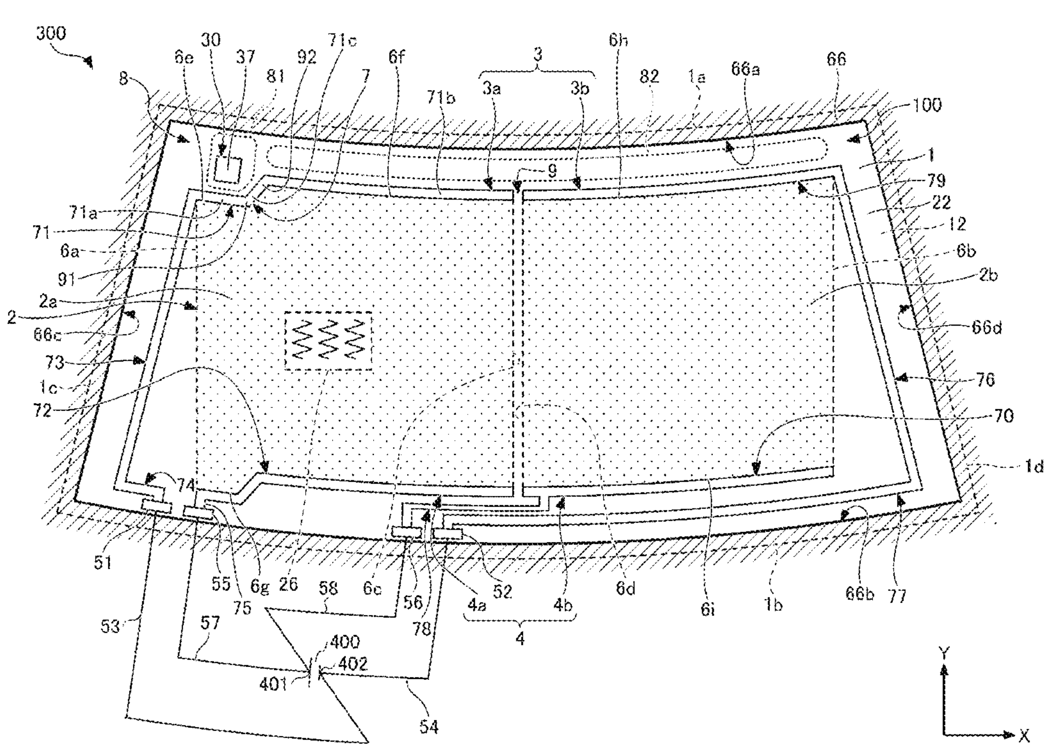
FIG. 1 is a view illustrating a structural example of the window glass apparatus for a vehicle according to a first embodiment as viewed from the interior of a vehicle.

Hereinafter, embodiments according to the present disclosure will be described with reference to the accompanying drawings. To facilitate understanding of the present disclosure, the scales of elements in the drawings may be different from the actual scales. In Description, regarding directions such as "parallel", "right angles", "orthogonal", "horizontal", "perpendicular", "up-down", and "left-right", deviations are tolerated to a degree with which operations or effects of the embodiments are not impaired. The shape of the corners is not limited to right angles and may be rounded in an arcuate shape. In Description, the terms "X-axis direction" and "Y-axis direction" refer to a direction parallel to the X axis and a direction parallel to the Y axis, respectively. The X-axis direction and the Y-axis direction are orthogonal to each other. In Description, the term "opposed to" is not necessarily refers to a case where one member or part and another member or part entirely are opposed to each other, and may refer to a case where the one member or part and the other member or part partially are opposed to each other.

According to the present embodiments, the X-axis direction represents the left-right direction (lateral direction) of a vehicle body, a vehicle width direction of the vehicle body, or the horizontal direction (a direction parallel to a horizontal plane). The Y-axis direction represents the up-down direction (longitudinal direction) of the vehicle body or the vertical direction (a direction perpendicular to the horizontal plane).

The window glass for a vehicle according to the present embodiments may be appropriately applicable to a windshield to be attached to a front portion of a vehicle.

FIG. 1 is a view illustrating a structural example of the window glass apparatus for a vehicle according to a first embodiment as viewed from the interior of the vehicle. The window glass apparatus for a vehicle 300 shown in FIG. 1 includes a window glass 100 attached to a sash 66 formed in the vehicle body. The window glass 100 exemplified in FIG. 1 is a windshield attached to the sash 66 formed in the front portion of the vehicle body.

The sash 66 includes an upper frame 66*a*, a lower frame 66*b*, a left frame 66*c*, and a right frame 66*d* so as to form an opening covered by the window glass 100. The upper frame 66*a* is a sash portion extending in the X-axis direction on the positive side in the Y-axis direction of the vehicle body. The upper frame is, for example, a flange on a ceiling side of the vehicle body. The lower frame 66*b* is a sash portion extending in the X-axis direction on the negative side in the Y-axis direction of the vehicle body. The lower frame is, for example, a flange on a dash panel side of the vehicle body. The left frame 66*c* is a sash portion that connects the upper frame 66*a* and the lower frame 66*b* on the negative side in the X-axis direction of the vehicle body as viewed from the interior of the vehicle. The left frame is, for example, a flange of an A-pillar on a front left side of the vehicle body as viewed from the interior of the vehicle. The right frame 66*d* is a sash portion that connects the upper frame 66*a* and the lower frame 66*b* on the positive side in the X-axis direction of the vehicle body as viewed from the interior of the vehicle. The right frame is, for example, a flange of an A-pillar on a front right side of the vehicle body as viewed from the interior of the vehicle.

The window glass apparatus for a vehicle 300 includes the window glass 100 attached to the sash 66 and an antenna 30 disposed in a space in the vehicle interior with respect to a glass plate 1 forming the window glass 100. The window glass 100 includes the glass plate 1, a first bus bar 3, and a second bus bar 4.

The glass plate 1 is an example of the glass plate for a vehicle. The glass plate 1 is a transparent or translucent plate-shaped dielectric attached to the sash 66. The glass plate 1 has a peripheral edge area including an upper edge 1*a*, a lower edge 1*b*, a left edge 1*c*, and a right edge 1*d*. The upper edge 1*a* is a glass edge extending in the X-axis direction on the positive side in the Y-axis direction of the vehicle body. The upper edge is attached to, the upper frame 66*a*. The lower edge is a glass edge extending in the X-axis direction on the negative side in the Y-axis direction of the vehicle body. The lower edge is attached to the lower frame 66*b*. The left edge 1*c* is a glass edge that connects the upper edge 1*a* and the lower edge 1*b* on the negative side in the X-axis direction of the vehicle body. The left edge is attached to the left frame 66*c*. The right edge 1*d* is a glass edge that connects the upper edge 1*a* and the lower edge 1*b* on the positive side in the X-axis direction of the vehicle body. The right edge is attached to the right frame 66*d*.

The glass plate 1 has a principal surface 22 and a principal surface 12 on the opposite side from the principal surface 22. According to this example, the principal surface 22 is a surface on a vehicle interior side while the principal surface 12 is a surface on a vehicle exterior side.

The first bus bar 3 is a strip electrode provided in or on the glass plate 1. The first bus bar 3 has upper portions 71 and 79 extending in a direction along the upper edge 1*a* of the glass plate 1 (for example, a substantially horizontal direction). The first bus bar 3 is electrically connected to one of electrode terminals (for example, a negative terminal 402) of a power source 400 mounted on the vehicle.

The second bus bar 4 is a strip electrode provided in or on the glass plate 1. The second bus bar 4 has lower portions 72 and 70 extending in a direction along the lower edge 1*b* of the glass plate 1 (for example, a substantially horizontal direction). The second bus bar 4 is electrically connected to the other electrode terminal (for example, a positive terminal 401) of the power source 400 mounted on the vehicle.

Alternatively, the first bus bar 3 may be electrically connected to the positive terminal 401 of the power source 400 while the second bus bar 4 may be electrically connected to the negative terminal 402 of the power source 400.

The glass plate 1 includes a heating area 2 extending between the upper portions 71 and 79 of the first bus bar 3 and the lower portions 72 and 70 of the second bus bar 4. The heating area 2 is an area where a conductive member 26 is disposed. The heating area 2 is heated by heat generated in the conductive member 26. The heating area 2 has longitudinal sides 6*a* and 6*b* that are a pair of lateral sides opposed to each other in the X-axis direction.

The conductive member 26 is disposed in the glass plate 1 and positioned between the upper portions 71 and 79 of the first bus bar 3 and the lower portions 72 and 70 of the second bus bar 4. When a direct-current voltage is applied, by using the power source 400, across the first bus bar 3 and the second bus bar 4, the direct current flows through the conductive member in the up-down direction between the upper portions 71 and 79 and the lower portions 72 and 70. The conductive member 26 generates heat when the direct current flows in the up-down direction of the glass plate 1. The heating area 2 is heated by the heat generated in the conductive member 26 that electrically connects the upper portions 71 and 79 of the first bus bar 3 and the lower portions 72 and 70. The heating area 2 is heated to perform snow-melting, ice-melting, defogging and the like in the heating area 2 and an area near the heating area 2 in the glass plate 1.

The conductive member 26 includes, for example, as shown in an enlarged view in FIG. 1, a plurality of heating wires that extend in the up-down direction of the glass plate 1 so as to spaced apart from each other in the X-axis direction. The plural heating wires are, for example, wavy linear conductors extending from the first bus bar 3 toward the second bus bar 4. The heating wires are made of, for example, copper, aluminum, chrome, molybdenum, nickel, titanium, palladium, indium, tungsten, gold, platinum or silver, or an alloy including any two or more thereof.

The conductive member 26 may be a transparent or translucent conductive film disposed in an inner layer or on an outer surface of the glass plate 1, a heat generating wire disposed in the inner layer or the outer surface of the glass plate 1, or a silver-based print formed on the surface of the glass plate 1. As the glass plate 1, a laminated glass may be usually used in which a resin intermediate film made of polyvinyl butyral (PVB), ethylene-vinylacetate copolymer (EVA), or the like is interposed between two glass plates. The expression "the conductive member 26 is dispose in an inner layer of the glass plate 1" means that the conductive member 26 is configured so as to be sealed in the laminated glass.

When the conductive member 26 is a conductive film, an antimony-doped tin oxide, a bismuth-doped tin oxide, a fluorine-doped tin oxide, or the like may be applicable as the material of the conductive film.

The conductive member 26 may be installed in the inner layer or on the outer surface of the glass plate 1. The conductive member 26 is disposed in the same layer (inner layer or the outer surface) as the first bus bar 3 and the second bus bar 4. So long as electrical connection is ensured, via an auxiliary member, between the first bus bar 3 and the second bus bar 4, the conductive member 26 may be disposed in a layer different from at least one of the first bus bar 3 and the second bus bar 4.

The heating area 2 where the conductive member 26 is disposed may be divided into a plurality of heating areas arranged in the X-axis direction. In the example shown in FIG. 1, the heating area 2 has two areas, that is, a first heating area 2*a* and a second heating area 2*b*, arranged in the X-axis direction with a clearance 9 extending in a longitudinal direction as the up-down direction. The heating area 2 may have three or more areas. The first heating area 2*a* has upper sides 6*e* and 6*f* electrically connected to the upper portion 71 of the first bus bar 3, a lower side 6*g* electrically connected to the lower portion 72 of the second bus bar 4, and the longitudinal side 6*a* and a longitudinal side 6*c* opposed to the former as a pair in the X-axis direction. The second heating area 2*b* has an upper side 6*h* electrically connected to the upper portion 79 of the first bus bar 3, a lower side 6*i* electrically connected to the lower portion 70 of the second bus bar 4, and the longitudinal side 6*b* and a longitudinal side 6*d* opposed to the former as a pair in the X-axis direction.

In the example shown in FIG. 1, the heating area 2 is divided into the plural heating areas, and accordingly, each of the first bus bar 3 and the second bus bar 4 is divided. The first bus bar 3 includes a first upper bus bar 3*a* and a second upper bus bar 3*b*. The second bus bar 4 includes a first lower bus bar 4*a* and a second lower bus bar 4*b*.

The first bus bar 3 may further include a longitudinal portion connected to the upper portions 71 and 79. In the first bus bar 3 shown in FIG. 1, the first upper bus bar 3*a* includes a longitudinal portion 73 connected to the upper portion 71 while the second upper bus bar 3*b* includes a longitudinal portion 76 connected to the upper portion 79. The upper portion 71 is a conductor portion connected to the upper sides 6*e* and 6*f* of the first heating area 2*a*. The longitudinal portion 73 is a conductor portion apart from the longitudinal side 6*a* as one of the lateral sides of the first heating area 2*a* and extending along the left edge 1*c* as one of the side edges of the glass plate 1. The upper portion 79 is a conductor portion connected to the upper side of the second heating area 2*b*. The longitudinal portion 76 is a conductor portion apart from the longitudinal side 6*b* as one of the sides of the second heating area 2*b* and extending along the right edge 1*d* as the other side edge of the glass plate 1.

Since the first bus bar 3 includes the longitudinal portions 73 and 76 respectively connected to the upper portions 71 and 79, wiring lines for electrically connecting the upper portions 71 and 79 of the first bus bar 3 to the power source 400 can be partly disposed on the glass plate 1 instead of the vehicle body. Thus, harnesses (the length of harnesses) wired on the vehicle body can be reduced.

As shown in FIG. 1, the first bus bar 3 may further include a lateral portion 74 connected to the longitudinal portion 73 and a lateral portion 77 connected to the longitudinal portion 76. The lateral portion 74 is a conductor portion extending in a direction along the lower edge 1*b* of the glass plate 1 in an area spaced apart from the first heating area 2*a*. The lateral portion 77 is a conductor portion extending in a direction along the lower edge 1*b* of the glass plate 1 in an area spaced apart from the second heating area 2*b*. The provision of the lateral portion 74 or the lateral portion 77 can further reduce the harnesses (the length thereof), depending on the positions of terminals of the harnesses wired on the vehicle side.

In the example shown in FIG. 1, the glass plate 1 includes a plurality of electrodes 51, 52, 55, and 56 that are electrically connected to the terminals of the harnesses electrically connected to the power source 400.

The electrode 51 is a negative pole that electrically connects the first upper bus bar 3*a* to a terminal of a ground harness 53 electrically connected to the negative terminal 402. The electrode 51 is electrically connected to the upper portion 71 of the first bus bar 3 via the lateral portion 74 and the longitudinal portion 73.

The electrode 52 is a negative pole that electrically connects the second upper bus bar 3*b* to a terminal of a ground harness 54 electrically connected to the negative terminal 402. The electrode 52 is electrically connected to the upper portion 79 of the first bus bar 3 via the lateral portion 77 and the longitudinal portion 76.

The electrode 55 is a positive pole that electrically connects the first lower bus bar 4*a* to a terminal of a power source harness 57 electrically connected to the positive terminal 401. The first lower bus bar 4*a* has a connection bus bar 75 connected to the lower portion 72 of the second bus bar 4. The electrode 55 is electrically connected to the lower portion 72 via the connection bus bar 75.

The electrode 56 is a positive pole that electrically connects the second lower bus bar 4*b* to a terminal of a power source harness 58 electrically connected to the positive terminal 401. The second lower bus bar 4*b* has a connection bus bar 78 connected to the lower portion 70 of the second bus bar 4. The electrode 56 is electrically connected to the lower portion 70 via the connection bus bar 78.

The antenna 30 transmits and receives (or performs at least one of transmission or reception) radio waves in a certain frequency band F. The radio waves in the certain frequency band F may be vertically polarized waves, horizontally polarized waves, or circularly polarized waves. The antenna 30 is configured to transmit and receive radio waves in, for example, a high-frequency band such as microwaves or millimeter waves (for example, 0.3 GHZ to 300 GHz). When the antenna 30 can transmit and receive radio waves in at least one of a 5.8 GHz band or a 5.9 GHz band, the antenna 30 is preferred as an antenna for a vehicle. Although the antenna 30 can be applied to, for example, the V2X communication system, the 5th generation mobile communication system, the 6th generation mobile communication system, an automotive radar system, and the like, the application of the antenna 30 is not limited to these systems. Specific examples of the V2X communication system used for the intelligent transport system (ITS) or the like include a connected vehicles support system, a road-vehicle communication system (for example, the electronic toll collection (ETC) system).

The antenna 30 is disposed in a space near the glass plate 1. Thus, the antenna gain of the antenna 30 in the frequency band F becomes unlikely to be affected by the size of the heating area 2. Thus, the heating area 2 is compatible with the antenna 30 ensuring a sufficient antenna gain in the certain frequency band F. The antenna 30 is secured to the principal surface 22 of the glass plate 1 or a ceiling of a vehicle cabin by using an indirect member (not shown) such as a bracket or a housing such that the antenna 30 is disposed in a space near the upper portion 71 of the first bus bar 3.

The antenna 30 has a conductor 37 spaced apart from the glass plate 1 so as to be opposed to the glass plate 1. The conductor 37 may be a ground plane of the antenna 30 or a radiating element of the antenna 30. When the conductor 37 is spaced apart from the glass plate 1 so as to be opposed to the glass plate 1, the antenna gain of the antenna 30 in the frequency band F becomes unlikely to be affected by the size of the heating area 2. Thus, the heating area 2 is compatible with the antenna 30 ensuring a sufficient antenna gain in the certain frequency band F. In the example shown in FIG. 1, the antenna 30 is close to the upper portion 71 of the first bus bar 3 as viewed from the interior of the vehicle. In particular, the antenna 30 may be disposed at a position in the positive Y-axis direction so as to be spaced apart from a first upper portion 71*a* of the first bus bar 3 by a certain distance as viewed from the interior of the vehicle.

Figure 2:
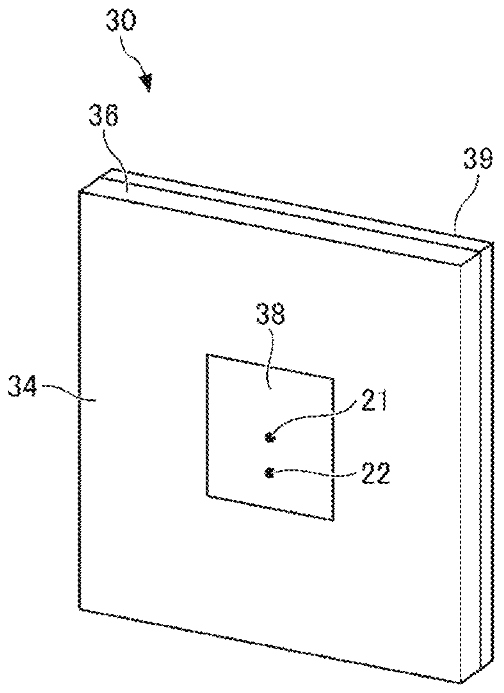
FIG. 2 is a perspective view illustrating a structural example of the antenna for transmitting and receiving radio waves in a certain frequency band.
Figure 2:
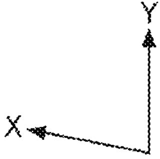

FIG. 2 is a perspective view illustrating a structural example of the antenna that transmits and receives the radio waves in the certain frequency band F. The antenna exemplified in FIG. 2 is a planar antenna (specifically, a patch antenna) that includes a dielectric substrate 36 having a radiating element 38 and a ground plane 39 thereon. The radiating element 38 is a patch element disposed on a surface of the dielectric substrate 36 on the vehicle exterior side. The ground plane 39 is a conductor surface disposed on a surface of the dielectric substrate 36 on the vehicle interior side. The shape of the antenna 30 is not limited to the shape shown in FIG. 2. In the structure shown in FIG. 2, the conductor 37 shown in FIG. 1 may be formed as the radiating element 38 or the ground plane 39. For example, in the case of the patch antenna shown in FIG. 2, the conductor 37 is preferably formed as the radiating element 38 since the radiating element 38 has, in many cases, a smaller area than the ground plane 39 as viewed in a thickness direction thereof.

Figure 3:
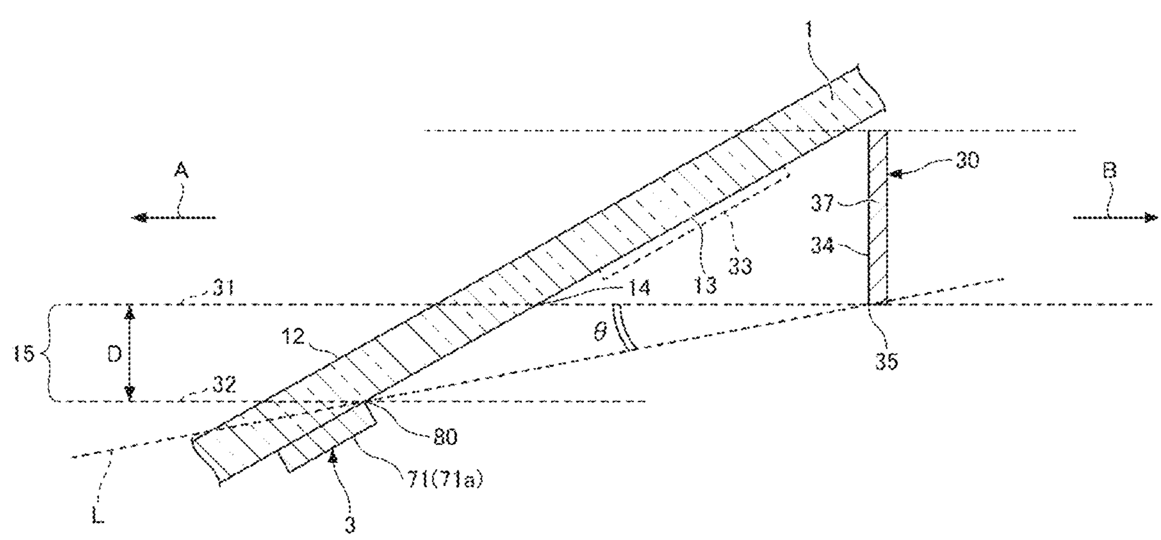
FIG. 3 is a cross-sectional view illustrating an upper part of a structural example of the window glass apparatus for a vehicle according to the first embodiment.

FIG. 3 is a cross-sectional view illustrating an upper part of a structural example of the window glass apparatus for a vehicle according to the first embodiment. Symbol A denotes the vehicle exterior side while symbol B denotes the vehicle interior side. As viewed in a horizontal direction from the vehicle interior side, there is a gap 15 between the conductor 37 (the radiating element 38 or the ground plane 39) and the upper portion 71 of the first bus bar 3. Since the gap 15 is formed, the radio waves radiated from the antenna 30 or received by the antenna 30 are unlikely to be interrupted by the upper portion 71 (in particular, the first upper portion 71*a* shown in FIG. 1) and the heating area 2. Thus, the antenna gain in the certain frequency band F can be ensured at a sufficient level.

The gap 15 is an area having no conductor. For example, in an area surrounded by a horizontal plane 31 passing through a lower end 35 of the conductor 37, a principal surface 12 of the glass plate 1 on the vehicle exterior side, a horizontal plane 32 passing through an upper end 80 of the upper portion 71 of the first bus bar 3, and a plane L passing through the upper end 80 and the lower end 35, the gap 15 refers to an area interposed between a lower side (the lower end 35) of the conductor 37 and an upper side (the upper end 80) of the upper portion 71 as viewed in the horizontal direction from the vehicle interior side. The horizontal plane 31 passes through a lower end 14 (lower side) of a projected plane 13 formed by projecting the conductor 37 onto the glass plate 1 in the horizontal direction. The plane L is an imaginary plane that forms a depression angle (angle θ) with respect to the horizontal plane 31.

The gap 15 includes a dielectric area of the glass plate 1 and a dielectric area on the vehicle interior side with respect to the glass plate 1. The dielectric area on the vehicle interior side with respect to the glass plate 1 is typically a space where air exists. The dielectric area may include a dielectric other than the air (for example, a resin).

In the example shown in FIG. 1, the antenna 30 is disposed in the space near the upper portion 71 so as not to overlap with the upper portions 71 and 79 of the first bus bar 3 as viewed in the horizontal direction from the vehicle interior side. More specifically, the antenna 30 is disposed in the space near the upper portion 71 so as to overlap with a non-heating area 8 extending above the upper portions 71 and 79 as viewed in the horizontal direction from the vehicle interior side. The non-heating area 8 is an upper area between the upper frame 66*a* (an upper side of the opening) of the sash 66 and the upper portions 71 and 79 of the first bus bar 3 in the entire area as viewed in the horizontal direction from the vehicle interior side.

The first heating area 2*a* includes the first upper side 6*f* extending in the direction along the upper edge 1*a* of the glass plate 1 and the second upper side 6*e* extending in the direction along the upper edge 1*a* so as to be farther from the upper edge 1*a* than the first upper side 6*f*. The upper portion 71 of the first upper bus bar 3*a* extends along the first upper side 6*f* and the second upper side 6*e* of the first heating area 2*a*. By this arrangement, as shown in FIG. 1, the upper portion 71 of the first upper bus bar 3*a* has a cranked portion 7 formed therein. The formation of the cranked portion 7 provides the non-heating area 8 with a recessed portion 81 descending downward as viewed in the horizontal direction from the vehicle interior side. The projected plane 13 (see FIG. 3) overlaps with the recessed portion 81. This arrangement can space the antenna 30 apart from the upper frame 66*a* of the sash 66 such that the radio waves radiated from the antenna 30 or received by the antenna 30 are unlikely to be interrupted by the upper frame 66*a* of the sash 66. Thus, the antenna gain in the certain frequency band F can be sufficiently ensured at a large angle.

Alternatively, the recessed portion 81 may be an area that is delimited, in the non-heating area 8, by a line segment extending upward from an end portion of the first heating area 2*a* adjacent the first upper side 6*f* in the cranked portion 7 to the upper frame 66*a* (the upper side of the opening) of the sash 66. Alternatively, the recessed portion 81 may be, in the non-heating area 8, a quadrangular area having a longitudinal length as the height of the cranked portion 7 in the up-down direction and a lateral length as the total of the lengths of the cranked portion 7 and the first upper portion 71*a* of the first heating area 2*a* in the X-axis direction.

The upper portion 71 of the first bus bar 3 has the cranked portion 7, the first upper portion 71*a* extending from the cranked portion 7 toward the longitudinal portion 73 on one side, and a second upper portion 71*b* extending from the cranked portion 7 toward the clearance 9 on the other side.

The cranked portion 7 has a third upper portion 71*c*, a first bent portion 91 formed at a connecting portion between the first upper portion 71*a* and the third upper portion 71*c*, and a second bent portion 92 formed at a connection portion between the second upper portion 71$b$ and the third upper portion 71$c$. Thus, the cranked portion 7 is formed in a cranked shape.

Since the recessed portion 81 is formed in the non-heating area 8, the non-heating area 8 has an area 82 formed in addition to the recessed portion 81. In this arrangement, the length of the area 82 other than the recessed portion 81 in the up-down direction can be set to be shorter than the length of the recessed portion 81 in the up-down direction such that the length, in the up-down direction, of the first heating area 2$a$ connected to the second upper portion 71$b$ can be relatively increased. Thus, in addition to sufficiently ensuring the antenna gain of the antenna 30 in the certain frequency band F, the effects of defogging and deicing in the glass plate 1 can be further prevented from be degraded.

Furthermore, the example shown in FIG. 1 has a cranked portion formed at a position opposed to the cranked portion 7 out of the lower portion 72 of the first lower bus bar 4$a$ so as to be recessed in the same direction as the cranked portion 7 formed in the upper portion 71 of the first upper bus bar 3$a$. Thus, the first heating area 2$a$ has a uniform length in the up-down direction through the X-axis direction, and the conductive member 26 has a uniform electrical resistance in the first heating area 2$a$. This arrangement prevents heating unevenness from being locally caused in the first heating area 2$a$.

Figure 4:
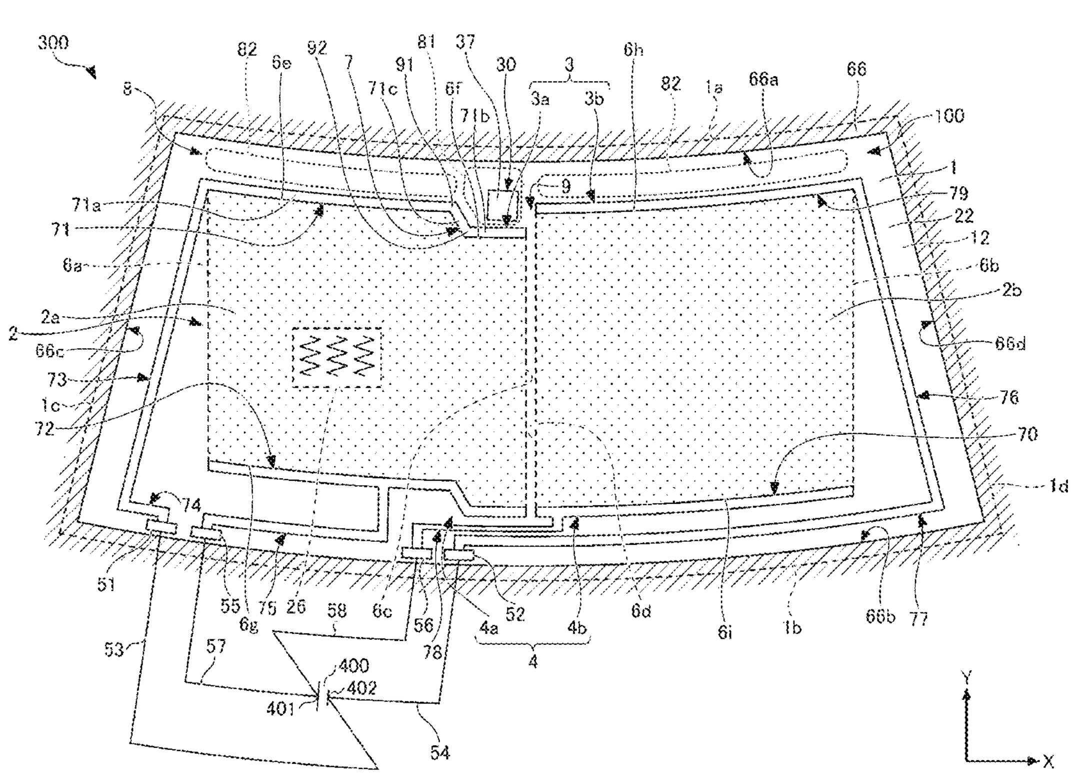
FIG. 4 is a diagram illustrating a structural example (modification) of the window glass apparatus for a vehicle according to the first embodiment as viewed from the interior of the vehicle.

The recessed portion 81 may be disposed in an upper central portion of the glass plate 1 as in a modification shown in FIG. 4. In the example shown in FIG. 4, the first upper side 6$f$ of the first heating area 2$a$ and the second upper portion 71$b$ of the first bus bar 3 are farther from the upper edge 1$a$ of the glass plate 1 than the second upper side 6$e$ of the first heating area 2$a$ and the first upper portion 71$a$ of the first bus bar 3 and extend in a direction along the upper edge 1$a$. The antenna 30 can be disposed in a space in the upper central portion of the glass plate 1 so as to be near the upper portion 71 of the first upper bus bar 3$a$ as shown in FIG. 4 to transmit and receive the radio waves from the vicinity of the center of a vehicle width toward the exterior of the vehicle at a large angle in the horizontal direction. When the projected plane 13 (see FIG. 3) overlaps with the recessed portion 81 in the upper central portion of the glass plate 1, the antenna 30 can transmit and receive the radio waves from the vicinity of the center of the vehicle width toward the exterior of the vehicle at a large angle in the horizontal direction and the up-down direction. For example, when the antenna 30 is a V2X antenna, the antenna gain is likely to have not only a small imbalance but also a well-balanced directivity through an area from the central portion of the vehicle width to the A-pillars on the left and right of the vehicle body. The central portion may be defined in a range from 0.30 to 0.70, 0.35 to 0.65, or 0.40 to 0.60 wherein the glass plate has a width set at 1 (in the horizontal direction).

Next, the arrangement relationship between the antenna 30 and the non-heating area 8 is described. Referring to FIG. 3, the angle (depression angle) formed between the horizontal plane 31 and the plane L connecting the lower end 35 of the conductor 37 and the upper end 80 of the first upper portion 71$a$ of the upper portion 71 of the first upper bus bar 3$a$ is defined as θ. When the angle θ is at least 5°, the radio waves radiated from the antenna 30 or received by the antenna 30 are unlikely to be interrupted by the upper portion 71 and the heating area 2. Accordingly, the antenna gain in the certain frequency band F can be sufficiently ensured. To sufficiently ensure the antenna gain, the angle θ is preferably at least 6°, more preferably at least 7°, and further preferably at least 8°. The angle θ has no particular upper limit so long as the area of the heating area 2 is not excessively reduced. The upper limit is preferably, for example, at most 20°.

It is assumed that the gap 15 has a length D in the vertical direction, and that the radio waves received by the antenna 30 have a wavelength λ in the air. At this time, when the length D satisfies "$(1/4)\times\lambda\leq D$", the radio waves radiated from the antenna or received by the antenna 30 are unlikely to be interrupted by the heating area 2. Thus, the antenna gain in the certain frequency band F can be sufficiently ensured. To sufficiently ensure the antenna gain, the length D is preferably greater than or equal to $(1/4)\times\lambda$, more preferably greater than or equal to $((1/4)\times\lambda/\sin\theta$.

In the case where the radio waves transmitted and received by the antenna 30 have a frequency of 5.9 GHZ, when the length D is at least 13 mm, the radio waves radiated by the antenna 30 or received by the antenna 30 are unlikely to be interrupted by the heating area 2. Thus, the antenna gain in the certain frequency band F can be sufficiently ensured.

Figure 5:
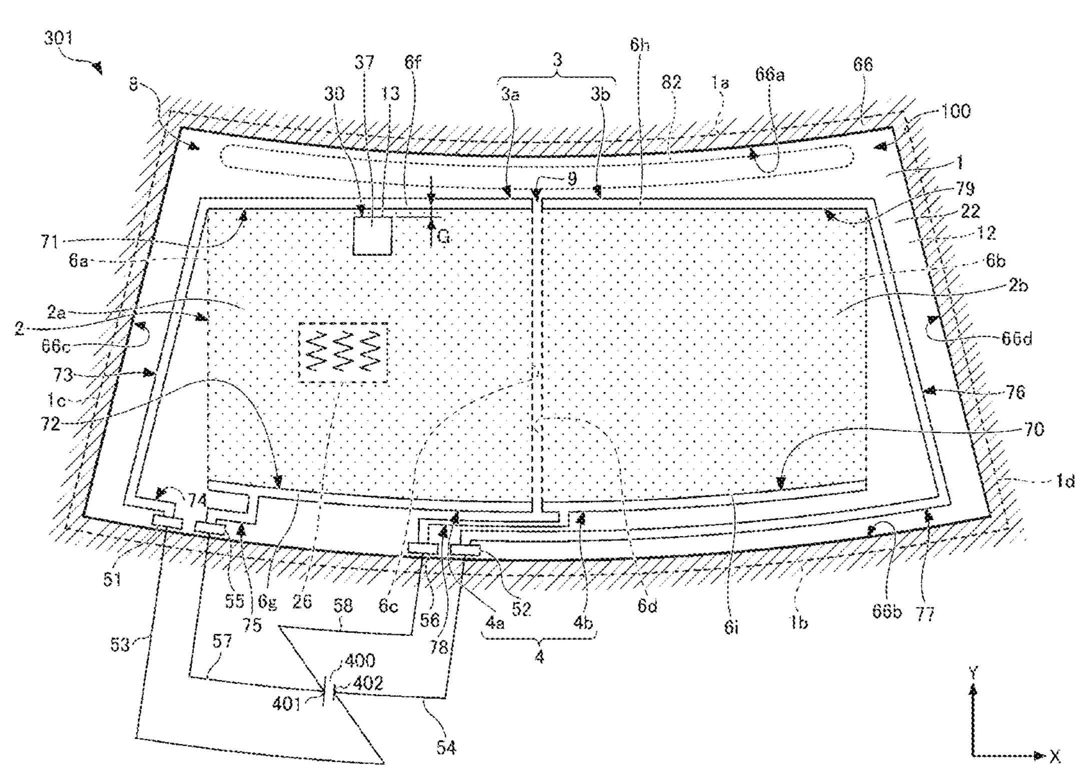
FIG. 5 is a diagram illustrating a structural example of a window glass apparatus for a vehicle according to a second embodiment as viewed from the interior of the vehicle.
Figure 6:
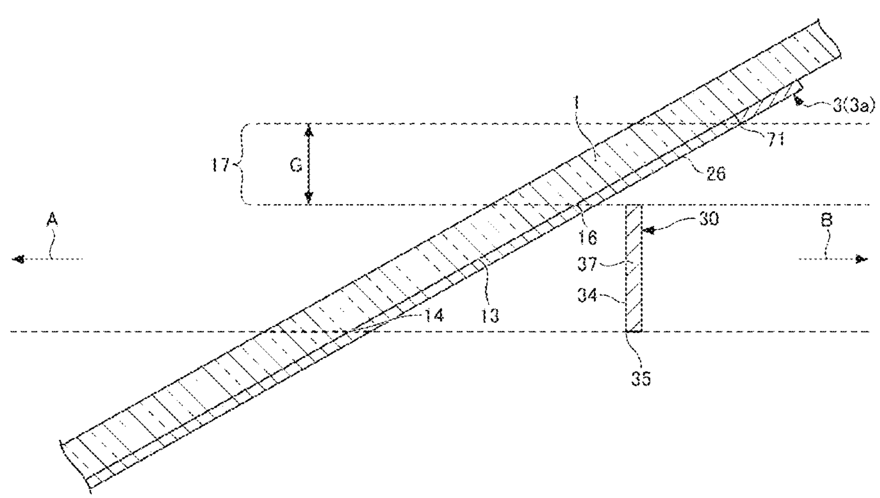
FIG. 6 is a cross-sectional view illustrating an upper part of the structural example of the window glass apparatus for a vehicle according to the second embodiment.

FIG. 5 is a view illustrating a structural example of the window glass apparatus for a vehicle according to a second embodiment in plan view of the window glass. Regarding the second embodiment, explanation of functions and advantages similar to the first embodiment is also applicable to the second embodiment and will be omitted. The window glass apparatus for a vehicle 301 shown in FIG. 5 is different from the window glass apparatus for a vehicle 300 according to the first embodiment in that the projected plane 13 on which the conductor 37 is projected horizontally onto the glass plate 1 overlaps the heating area 2. Furthermore, when the projected plane 13 of the conductor 37 overlaps with the upper portion 71 of the first bus bar 3, the radio waves incoming from above the vehicle or radiated to above the vehicle may be interrupted. From this point of view, the projected projection plane 13 is desirably disposed so as not to overlap with the first bus bar 3. In particular, as shown in FIG. 6, a gap 17 is preferably formed between the conductor 37 and the upper portion 71 of the first bus bar 3 in plan view from the vehicle interior side. By the provision of the gap 17, the radio waves radiated from the antenna 30 or received by the antenna 30 are unlikely to be interrupted by the upper portion 71 of the first bus bar 3. Thus, the antenna gain in the certain frequency band F can be sufficiently ensured.

Referring to FIG. 5, the antenna 30 transmits and receives vertically polarized waves. In a mode where the conductive member 26 disposed in the heating area 2 includes the plural linear conductors extending in the up-down direction of the glass plate 1 and arranged in the X-axis direction, vertically polarized waves parallel to the longitudinal direction of the plural linear conductors are likely to be interrupted by the conductive member 26. However, the antenna gain in the certain frequency band F is sufficiently ensured since the antenna 30 is disposed in a space near the glass plate 1. Accordingly, even when the antenna 30 is spatially disposed such that the projected plane 13 overlaps with the heating area 2, the antenna gain in the certain frequency band F can be prevented from lowering.

Figure 7:
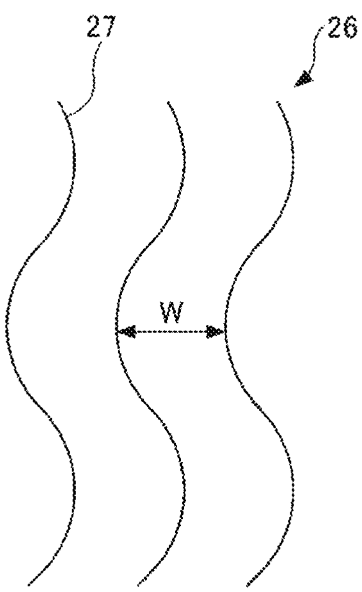
FIG. 7 is a front view exemplifying a plurality of linear conductors included in a conductive member on a projected plane formed by projecting an antenna conductor onto a glass plate in a horizontal direction.

FIG. 7 is a front view exemplifying a plurality of linear conductors 27 included in the conductive member 26 on the projected plane 13 formed by projecting the conductor 37 of the antenna 30 onto the glass plate 1 in the horizontal direction. It is assumed that the plural linear conductors 27 are spaced at intervals of W in the horizontal direction, and that the radio waves transmitted or received by the antenna 30 have a wavelength of λ in the air. At this time, when the intervals W satisfy "$W\geq 0.15\times\lambda$", the radio waves radiated from the antenna 30 or received by the antenna 30 are unlikely to be interrupted by the plural linear conductors 27. Thus, the antenna gain in the certain frequency band F can be sufficiently ensured. To sufficiently ensure the antenna gain, the intervals W are preferably at least 0.20λ, more preferably at least 0.30λ.

In the case where the radio waves transmitted and received by the antenna 30 have a frequency of 5.9 GHZ, when the intervals W are at least 8 mm, the radio waves radiated by the antenna 30 or received by the antenna 30 are unlikely to be interrupted by the plural linear conductors 27. Thus, the antenna gain in the certain frequency band F can be sufficiently ensured.

Referring to FIGS. 5 and 6, in plan view of the glass plate 1, when a gap length G between the projected plane 13 and the upper portion 71 of the first bus bar 3 in the vertical direction is at least 0.25 (=λ/4), the radio waves radiated from the antenna 30 or received by the antenna 30 are unlikely to be interrupted by the upper portion 71. Thus, the antenna gain in the certain frequency band F can be sufficiently ensured. To sufficiently ensure the antenna gain, the gap length G is preferably at least 0.35λ, more preferably at least 0.50λ.

According to each of the above-described embodiments, the antenna 30 has a radiating surface 34 (see FIGS. 2 and 3) radiating the radio waves. The window glass apparatus for a vehicle 300 or the like according to each of the embodiments may include a dielectric 33 (see FIG. 3) having a relative dielectric constant of greater than 1 between the glass plate 1 and the radiating surface 34. The provision of the dielectric 33 can control the frequency characteristic of the antenna 30. The dielectric 33 may be a spacer or a matching film. The dielectric 33 may be a member including a resin.

Figure 8:
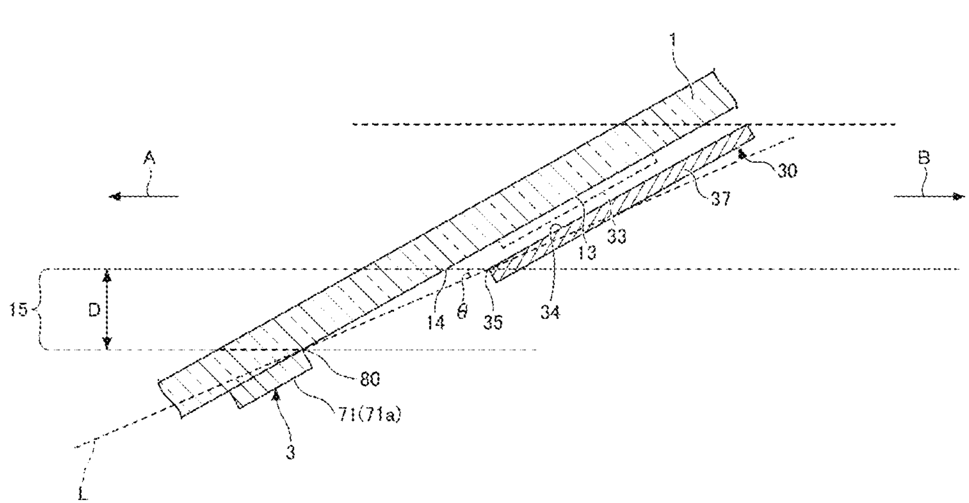
FIG. 8 is a cross-sectional view illustrating an upper part of the structural example (modification) of the window glass apparatus for a vehicle according to each of the embodiments.

The radiating surface 34 may be disposed substantially parallel to the vertical direction as shown in FIG. 3 or substantially parallel to the glass plate 1 as shown in FIG. 8. Even when the radiating surface 34 of the antenna 30 is disposed, as shown in FIG. 8, at such an angle that the radiating surface 34 is closer to the glass plate 1 than in the case where the radiating surface 34 is disposed in the vertical direction, the antenna 30 is disposed with the dielectric 33 interposed between the radiating surface 34 and the glass plate 1. In this case, the spatial area occupied by the antenna 30 installed in the vehicle interior can be saved to increase the cabin space of the vehicle. Also in the example shown in FIG. 8, the dielectric 33 having a relative dielectric constant of greater than 1 may be disposed between the glass plate 1 and the radiating surface 34 as is the case with the example shown in FIG. 3. Referring to FIG. 8, although the distance between the glass plate 1 and the radiating surface 34 is not particularly limited, it is sufficient that the distance be at most 30 mm, preferably at most 20 mm, more preferably at most 10 mm, further preferably at most 5 mm, and particularly preferably at most 3 mm. Although the lower limit of the distance is not particularly limited, it is sufficient that the distance be greater than 0 mm.

Although the angle formed between the principal surface of the glass plate 1 and the horizontal plane is not particularly limited, the glass plate 1 is disposed at an angle of, for example, at least 20° and at most 30° with respect to the horizontal plane.

Figure 9:
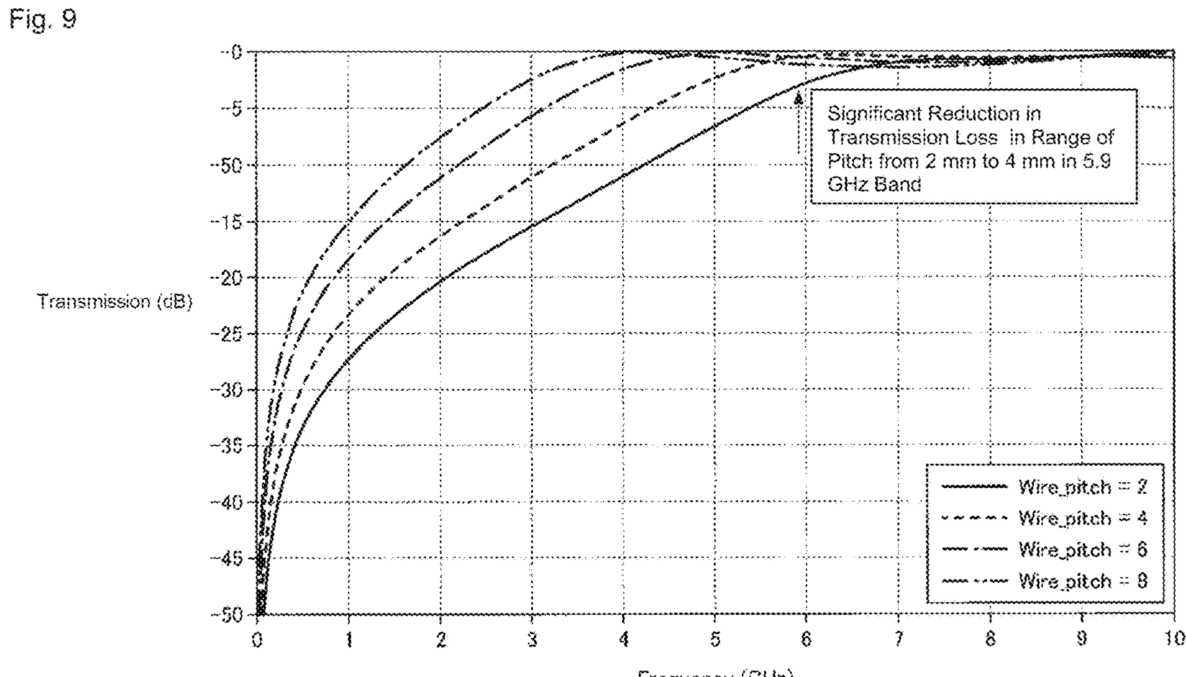
FIG. 9 is a view illustrating an example of simulation results of a transmission characteristic of the antenna depending on differences in the intervals of a plurality of linear conductors, in the horizontal direction, included in the conductive member.

FIG. 9 is a view illustrating an example of simulation results of the transmission characteristics of the antenna 30 depending on the difference in the intervals W of the plural linear conductors 27, in the horizontal direction, included in the conductive member 26 disposed in the heating area 2. At this case, the gap length G was set to be greater than or equal to (¼)×λ(=12.7 mm). FIG. 9 illustrates data obtained when the radio waves transmitted and received by the antenna 30 were vertically polarized waves in the case where the projected plane 13 overlapped with the heating area 2. The obtained results indicated that the radio wave transmissivity was improved in a frequency band of lower than 6 GHz according to an increase in the distance W. The obtained results indicated that, in particular, when the distance W (pitch) is at least 2 mm and at most 4 mm, the radio wave transmissivity in the 5.9 GHz band was improved with the heating performance of the heating area 2 being sufficiently ensured.

Although the embodiments have been described above, the technique according to the present disclosure is not limited to the above-described embodiments. Various changes and improvements such as a combination with or substitution of part or the entirety of other embodiments can be made.

For example, the window glass for a vehicle is not limited to a windshield but may be a window glass to be attached to another portion of the vehicle body. For example, the window glass for a vehicle may be a rear window glass attached to a sash in a rear portion of the vehicle body, a side window glass attached to a sash in a side portion of the vehicle body, a roof window glass attached to a sash in a ceiling portion of the vehicle body, or the like.

REFERENCE SYMBOLS

1: glass plate
1*a*: upper edge
1*b*: lower edge
1*c*: left edge
1*d*: right edge
2: heating area
2*a*: first heating area
2*b*: second heating area
3: first bus bar
3*a*: first upper bus bar
3*b*: second upper bus bar
4: second bus bar
4*a*: first lower bus bar
4*b*: second lower bus bar
5: antenna area
6*a*, 6*b*, 6*c*, 6*d*: longitudinal side
6*e*, 6*f*: upper side
6*g*: lower side
7: cranked portion
8: non-heating area
9: clearance
11, 12, 22: principal surface
13: projected plane
14: lower end
15, 17: gap
16: upper end
26: conductive member
27: linear conductor
30: antenna
31, 32: horizontal plane
33: dielectric
34: radiating surface
35: lower end
36: dielectric substrate
37: conductor
38: radiating element
39: ground plane

51, 52, 55, 56: electrode
53, 54: ground harness
57, 58: power source harness
66: sash
66*a*: upper frame
66*b*: lower frame
66*c*: left frame
66*d*: right frame
70, 72: lower portion
71, 79: upper portion
71*a*: first upper portion
71*b*: second upper portion
71*c*: third upper portion
73, 76: longitudinal portion
74, 77: lateral portion
75, 78: connection bus bar
80: upper end
81: recessed portion
82: area
91: first bent portion
92: second bent portion
100: window glass
300, 301: window glass apparatus for a vehicle
400: power source
401: positive terminal
402: negative terminal

What is claimed is:

1. A window glass apparatus for a vehicle comprising:

a glass plate for a vehicle;

a first bus bar provided in or on the glass plate and including an upper portion extending in a direction along an upper edge of the glass plate;

a second bus bar provided in or on the glass plate and including a lower portion extending in a direction along a lower edge of the glass plate; and an antenna disposed in a space near the upper portion and configured to transmit and receive a radio wave having a certain frequency;

wherein the glass plate has a heating area extending between the upper portion and the lower portion, and a non-heating area extending above the upper portion;

wherein the heating area is an area where a conductive member is disposed, the conductive member being configured to flow a direct current in an up-down direction by applying the direct voltage between the first bus bar and the second bus bar by a power supply such that the heating area is heated by heat generation of the conductive member;

wherein the antenna has a conductor spaced apart from the glass plate and opposed to the glass plate;

wherein there is a gap between the conductor and the upper portion as viewed in a horizontal direction from a vehicle interior side; and wherein the following formula is satisfied:

$$(1/4)\times\lambda\leq D$$

wherein the antenna is configured to transmit and receive a radio wave having a wavelength λ in air, and the gap has a length D in a vertical direction.

2. The window glass apparatus for a vehicle according to claim 1, wherein the non-heating area has a recessed portion descending downward as viewed in a horizontal direction from the vehicle interior side; and wherein the recessed portion is configured to overlap with a projected plane formed by projecting the conductor onto the glass plate in the horizontal direction.

3. The window glass apparatus for a vehicle according to claim 1, wherein an angle formed between a horizontal plane and a plane connecting a lower end of the conductor and an upper end of the upper portion is at least 5°.

4. The window glass apparatus for a vehicle according to claim 1, wherein the length D is at least 13 mm.

5. The window glass apparatus for a vehicle according to claim 1, wherein the following formula is satisfied:

$$W\geq 0.15\times\lambda$$

wherein the antenna is configured to transmit and receive a radio wave having a wavelength λ in air, and the conductive member includes a plurality of linear conductors disposed at intervals W as viewed in the projected plane in the horizontal direction.

6. The window glass apparatus for a vehicle according to claim 5, wherein the intervals W are at least 8 mm.

7. The window glass apparatus for a vehicle according to claim 5, wherein a gap length G between the projected plane and the upper portion in a vertical direction is at least λ/4 in plan view of the glass plate.

8. The window glass apparatus for a vehicle according to claim 1, wherein:

the antenna has a radiating surface radiating the radio wave, and a dielectric having a relative dielectric constant of greater than 1 is disposed between the glass plate and the radiating surface.

9. The window glass apparatus for a vehicle according to claim 8, wherein the dielectric includes a resin.

10. The window glass apparatus for a vehicle according to claim 1, wherein:

the antenna has a radiating surface radiating the radio wave, and the radiating surface is disposed substantially parallel to the glass plate.

11. The window glass apparatus for a vehicle according to claim 1, wherein:

the antenna has a radiating surface radiating the radio wave, and the radiating surface is disposed substantially parallel to a vertical direction.

12. The window glass apparatus for a vehicle according to claim 1, wherein the antenna comprises a patch antenna.

13. The window glass apparatus for a vehicle according to claim 1, wherein the antenna is disposed in a space near the upper portion in a central portion of the glass plate in a horizontal direction.

14. The window glass apparatus for a vehicle according to claim 1, wherein the glass plate is disposed at an angle of at least 20° and at most 30° with respect to a horizontal plane.

15. The window glass apparatus for a vehicle according to claim 1, wherein the antenna is configured to transmit and receive the radio wave in at least one of a 5.8 GHz band or a 5.9 GHz band.

16. A window glass apparatus for a vehicle comprising:

a glass plate for a vehicle;

a first bus bar provided in or on the glass plate and including an upper portion extending in a direction along an upper edge of the glass plate;

a second bus bar provided in or on the glass plate and including a lower portion extending in a direction along a lower edge of the glass plate; and an antenna disposed in a space near the upper portion and configured to transmit and receive a radio wave having a certain frequency;

wherein the glass plate has a heating area extending between the upper portion and the lower portion, and a non-heating area extending above the upper portion;

wherein the heating area is an area where a conductive member is disposed, the conductive member being configured to flow a direct current in an up-down direction by applying the direct voltage between the first bus bar and the second bus bar by a power supply such that the heating area is heated by heat generation of the conductive member;

wherein the antenna has a conductor spaced apart from the glass plate and opposed to the glass plate;

wherein the antenna is configured to transmit and receive a vertically polarized wave; and wherein a projected surface on which the conductor is projected horizontally onto the glass plate overlaps the heating area.

17. The window glass apparatus for a vehicle according to claim 16, wherein the following formula is satisfied:

$$W \geq 0.15 \times \lambda$$

wherein the antenna is configured to transmit and receive a radio wave having a wavelength λ in air, and the conductive member includes a plurality of linear conductors disposed at intervals W as viewed in the projected plane in the horizontal direction.

18. The window glass apparatus for a vehicle according to claim 17, wherein the intervals W are at least 8 mm.

19. The window glass apparatus for a vehicle according to claim 17, wherein a gap length G between the projected plane and the upper portion in a vertical direction is at least λ/4 in plan view of the glass plate.

* * * * *